US009176247B2

(12) United States Patent
Imhof et al.

(10) Patent No.: US 9,176,247 B2
(45) Date of Patent: Nov. 3, 2015

(54) TENSOR-BASED METHOD FOR REPRESENTATION, ANALYSIS, AND RECONSTRUCTION OF SEISMIC DATA

(75) Inventors: Matthias Imhof, Katy, TX (US); Pavel Dimitrov, Houston, TX (US); John P. Kaufhold, Arlington, VA (US)

(73) Assignee: ExxonMobil Upstream Research Company, Houston, TX (US)

( * ) Notice: Subject to any disclaimer, the term of this patent is extended or adjusted under 35 U.S.C. 154(b) by 569 days.

(21) Appl. No.: 13/588,780

(22) Filed: Aug. 17, 2012

(65) Prior Publication Data

US 2013/0090857 A1 Apr. 11, 2013

Related U.S. Application Data

(60) Provisional application No. 61/544,062, filed on Oct. 6, 2011.

(51) Int. Cl.

*G06F 19/00* (2011.01)
*G01V 1/30* (2006.01)
*G01V 1/34* (2006.01)

(52) U.S. Cl.

CPC . *G01V 1/301* (2013.01); *G01V 1/30* (2013.01); *G01V 1/345* (2013.01); *G01V 2210/63* (2013.01)

(58) Field of Classification Search

CPC ........... G01V 1/30; G01V 1/28; G01V 1/306; G01V 1/282; G01V 1/36; G06F 19/00
USPC .................................................. 702/2, 14, 17
See application file for complete search history.

(56) References Cited

U.S. PATENT DOCUMENTS 4,910,716 A * 3/1990 Kirlin et al. .................... 367/24
4,916,615 A 4/1990 Chittineni (Continued)

FOREIGN PATENT DOCUMENTS

WO WO 99/64896 12/1999
WO WO 01/84462 11/2001

(Continued)

OTHER PUBLICATIONS

Keung et al. , External Extraction from 3-D Vector and noisy Scalar Fields, 1998, IEEE, 0-8186-9176-x/98.*

(Continued)

*Primary Examiner* — John Breene
*Assistant Examiner* — Mohammad K Islam
(74) *Attorney, Agent, or Firm* — ExxonMobil Upstream Research Company, Law Dept.

(57) ABSTRACT

Method for representing seismic data as a spatially varying, second-order tensor field (23). The spatial relationships expressed in these tensors are exploited to link, classify, or separate neighborhoods (22); or to infer global or relational properties among them, thereby suggesting geobodies despite a noisy background. The tensors may be decomposed into their fundamentals that may either be used directly as derivative datasets or attributes, or may be used to facilitate linkage, classification, or separation of neighborhoods or analysis of linkage patterns. Decomposition may be by eigenvalues, with the eigenvalues used to define attributes called ballness, plateness and stickness (24). Alternatively, connections may be made between points in the data where the tensor has been computed, called tokens (21), based on tensor voting and polarity. Or, the connections may be based on a distance measure between tokens.

4 Claims, 6 Drawing Sheets
(5 of 6 Drawing Sheet(s) Filed in Color)

Seismic data
21 Choose expansion points, called tokens
22 Choose neighborhoods around tokens
23 Form second-order tensor for each token from data within neighborhood
24 Analyze tensors by
(1) eigenvalue decomposition
or by connections between tokens based on:
(2) tensor voting plus polarity or
(3) distance between tokens
25 Hydrocarbon opportunities

(56) References Cited

U.S. PATENT DOCUMENTS

| | | | |
|---|---|---|---|
| 4,992,995 | A | 2/1991 | Favret |
| 5,047,991 | A | 9/1991 | Hsu |
| 5,265,192 | A | 11/1993 | McCormack |
| 5,274,714 | A | 12/1993 | Hutcheson et al. |
| 5,416,750 | A | 5/1995 | Doyen et al. |
| 5,444,619 | A | 8/1995 | Hoskins et al. |
| 5,465,308 | A | 11/1995 | Hutcheson et al. |
| 5,539,704 | A | 7/1996 | Doyen et al. |
| 5,586,082 | A | 12/1996 | Anderson et al. |
| 5,852,588 | A | 12/1998 | de Hoop et al. |
| 5,940,777 | A | 8/1999 | Keskes |
| 6,052,650 | A | 4/2000 | Assa et al. |
| 6,226,596 | B1 | 5/2001 | Gao |
| 6,236,942 | B1 | 5/2001 | Bush |
| 6,295,504 | B1 | 9/2001 | Ye et al. |
| 6,363,327 | B1 | 3/2002 | Wallet et al. |
| 6,411,903 | B2 | 6/2002 | Bush |
| 6,466,923 | B1 | 10/2002 | Young |
| 6,473,696 | B1 | 10/2002 | Onyia et al. |
| 6,516,274 | B2 | 2/2003 | Cheng et al. |
| 6,574,566 | B2 | 6/2003 | Grismore et al. |
| 6,618,678 | B1 | 9/2003 | Van Riel |
| 6,625,541 | B1 | 9/2003 | Shenoy et al. |
| 6,725,163 | B1 | 4/2004 | Trappe et al. |
| 6,735,526 | B1 | 5/2004 | Meldahl et al. |
| 6,757,614 | B2 | 6/2004 | Pepper et al. |
| 6,804,609 | B1 | 10/2004 | Brumbaugh |
| 6,847,895 | B2 | 1/2005 | Nivlet et al. |
| 6,950,786 | B1 | 9/2005 | Sonneland et al. |
| 6,957,146 | B1 | 10/2005 | Taner et al. |
| 6,970,397 | B2 | 11/2005 | Castagna et al. |
| 6,988,038 | B2 | 1/2006 | Trappe et al. |
| 7,162,463 | B1 | 1/2007 | Wentland et al. |
| 7,184,991 | B1 | 2/2007 | Wentland et al. |
| 7,188,092 | B2 | 3/2007 | Wentland et al. |
| 7,197,444 | B2 | 3/2007 | Bomar, Jr. et al. |
| 7,222,023 | B2 | 5/2007 | Laurent et al. |
| 7,243,029 | B2 | 7/2007 | Lichman et al. |
| 7,248,258 | B2 | 7/2007 | Acosta et al. |
| 7,248,539 | B2 | 7/2007 | Borgos et al. |
| 7,295,706 | B2 | 11/2007 | Wentland et al. |
| 7,295,930 | B2 | 11/2007 | Dulac et al. |
| 7,308,139 | B2 | 12/2007 | Wentland et al. |
| 7,453,767 | B1 | 11/2008 | Padgett |
| 7,463,552 | B1 | 12/2008 | Padgett |
| 7,953,675 | B2 | 5/2011 | Medioni et al. |
| 8,027,517 | B2 | 9/2011 | Gauthier et al. |
| 2003/0200030 | A1 | 10/2003 | Meldahl et al. |
| 2005/0171700 | A1 | 8/2005 | Dean |
| 2005/0288863 | A1 | 12/2005 | Workman |
| 2006/0116145 | A1 | 6/2006 | Hunzinger |
| 2006/0184488 | A1 | 8/2006 | Wentland |
| 2009/0060307 | A1 | 3/2009 | Ghanem et al. |
| 2009/0225628 | A1 | 9/2009 | Sayers |
| 2009/0234622 | A1 | 9/2009 | Sengupta et al. |
| 2010/0250475 | A1* | 9/2010 | Medioni et al. ................. 706/13 |
| 2011/0029291 | A1* | 2/2011 | Weng et al. ........................ 703/2 |
| 2011/0042098 | A1 | 2/2011 | Imhof |
| 2011/0115787 | A1* | 5/2011 | Kadlec .......................... 345/419 |
| 2012/0090834 | A1 | 4/2012 | Imhof |

FOREIGN PATENT DOCUMENTS

| | | |
|---|---|---|
| WO | WO 2007/005894 | 1/2007 |
| WO | WO 2009/142872 | 11/2009 |

OTHER PUBLICATIONS

Russell et al., Mahalanobis clustering, with applications to AVO classification and seismic reservoir parameter estimation, 2003, Crewes Research Report, vol. 15, 6-7.*

U.S. Appl. No. 13/500,557, filed Oct. 8, 2010, Imhof.

U.S. Appl. No. 61/598,233, filed Feb. 13, 2012, Imhof.

Engelsma, C. et al. (2010), "Painting seismic images in 3D," SEG Denver 2010 Annual Meeting, pp. 1271-1275.

Luo, Y. et al. (2006), "Computation of dips and azimuths with weighted structural tensor approach," *Geophysics* 71(5), pp. V119-V121.

Mangin, J.F. et al. (2002), "Distortion Correction and Robust Tensor Estimation for MR Diffusion Imaging," *Medical Image Analysis* 6, 15 pgs.

Nath, S.K. et al. (2005), "Adaptive Robust Structure for Orientation Estimation and Image Segmentation," *Lect. Notes Comput. Sci.*, pp. 445-453.

Tang, C.K. et al. (1998), "Extremal Feature Extraction from 3-D Vector and Noisy Scalar Fields," *Proc. IEEE Visualization*, pp. 95-102.

* cited by examiner

TENSOR-BASED METHOD FOR REPRESENTATION, ANALYSIS, AND RECONSTRUCTION OF SEISMIC DATA

CROSS-REFERENCE TO RELATED APPLICATION

This application claims the benefit of U.S. Provisional Patent Application 61/544,062, filed Oct. 6, 2011 entitled TENSOR-BASED METHOD FOR REPRESENTATION, ANALYSIS, AND RECONSTRUCTION OF SEISMIC DATA, the entirety of which is incorporated by reference herein.

FIELD OF THE INVENTION

This invention relates generally to the field of geophysical prospecting, and more particularly to the analysis of seismic data. Specifically, the invention is a method for a representation of seismic data that enables data analysis and reconstruction of obscured features.

BACKGROUND OF THE INVENTION

Seismic data volumes are three-dimensional images of the subsurface that are computed from seismic recordings for the purpose of locating and characterizing hydrocarbon reservoirs. These images show both geophysical and geological features. A traditional representation of seismic data is based on individual samples or voxels without accounting for larger structures in a direct manner. It has been recognized that a different representation for the seismic data may allow discovery of spatial relationship between neighboring samples, even capture these relations and facilitate operations over spatially related samples.

A first step in this direction may be the generation of a tensor representation for seismic data. One example of computing a seismic tensor to represent the orientation of seismic data is disclosed by Luo et al. ("Computation of Dips and Azimuths with Weighted Structure-Tensor Approach," *Geophysics* 71, 2006) who use the structure tensor to the derive dips and azimuths that characterize seismic reflections. Another example is disclosed by Engelsma and Hale ("Painting seismic images in 3D," *SEG Expanded Abstracts* 29, 1271-1275, (2010), doi:10.1190/1.3513075) who also use the structure tensor to compute geologic bodies in seismic data.

A second step may be exploitation of the tensors for discovery of spatial relationships within the data. In U.S. Pat. No. 7,953,675, Medioni and Mordohai disclose a method for grouping unorganized data with a known technique called tensor voting. Specifically, they present a form of tensor voting for data of very high dimensionality. Similarly, U.S. Patent Application No. 2009/0060307 by Ghanem and Liang describes another method and system for facilitating a tensor voting scheme that describes the context of particular receiver points defined in multidimensional data by accumulation of local information.

The term tensor voting refers to a method of data discovery that groups data points in a multidimensional space first by congregating points within a local neighborhood into a "tensor" that summarizes the alignment of the points in said neighborhood, i.e., the local trend. In the following "voting" step, these local alignments or trends are integrated to regional trends. Each local tensor broadcasts or radiates its trends to neighboring tensors. Similar local trends reinforce each other and form regional trends, while dissimilar local trends cancel each other. U.S. Patent Application No. 2009/0060307 and U.S. Pat. No. 7,953,675 both disclose specific procedures for performing this voting step. Tensor voting methods have been used to heal gaps in line segments such as blood vessels in x-ray tomographic images or pen strokes in handwriting letter recognition, but tensor methods have apparently not been used to heal seismic-geologic objects such as channels.

A main embodiment of the inventive method disclosed herein is not based on tensor voting, and has application to, among other things, discovery and reconstruction of geological features that are at least partially obscured in the seismic data by noise. Instead, different methods for accumulating information encoded by tensors are used. In addition, novel variations of traditional tensor-voting methods are disclosed.

SUMMARY OF THE INVENTION

In one embodiment, the invention is a computer-implemented method for analyzing a volume of seismic or seismic attribute data (the "seismic data volume") to discover spatial location and shape of geologic features of a subsurface region, comprising:

making a second-order tensor representation of the seismic data, and using a computer to perform decomposition of the tensor representation to form seismic attributes; wherein the tensor decomposition is eigenvalue decomposition, the eigenvalues being referred to as $\lambda_1$, $\lambda_2$, and $\lambda_3$, and wherein the seismic attributes comprise at least one of ballness ($\lambda_3$), plateness ($\lambda_2$-$\lambda_3$) and stickness ($\lambda_1$-$\lambda_2$) and their orientations; and using the seismic attributes to interpret the seismic data volume for geologic features.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

In countries where patent restrictions prevent the use of color drawings, this document will contain black-and-white reproductions of the original color drawings.

Figure 1:
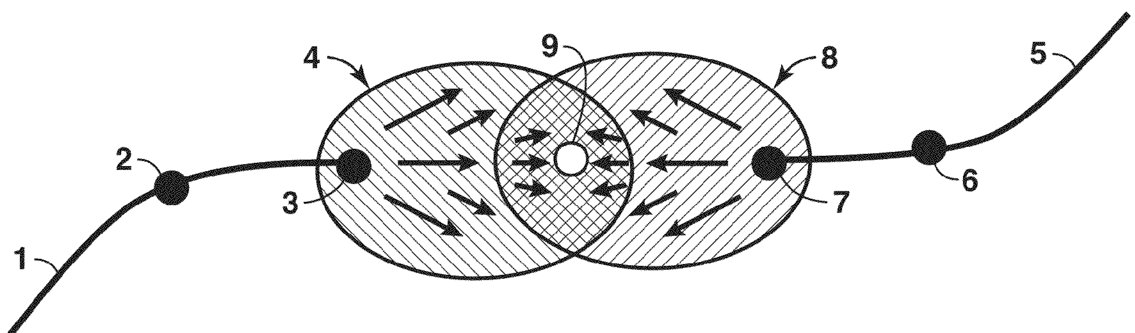
Figure 2:
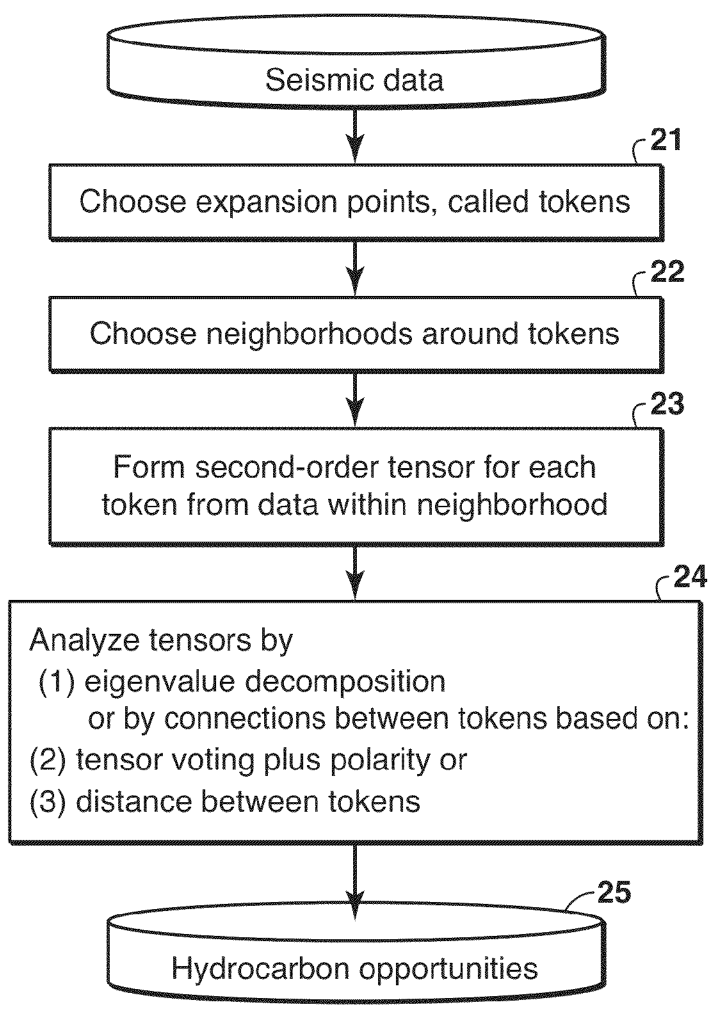
Figure 3:
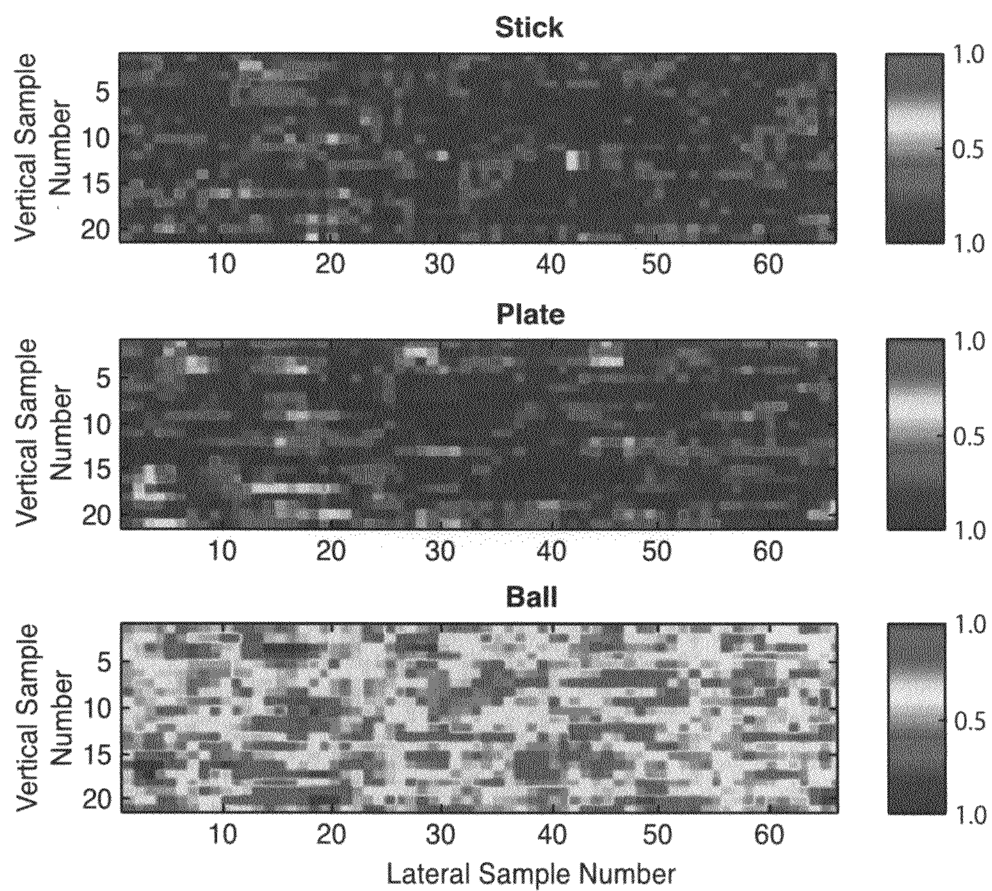
Figure 4:
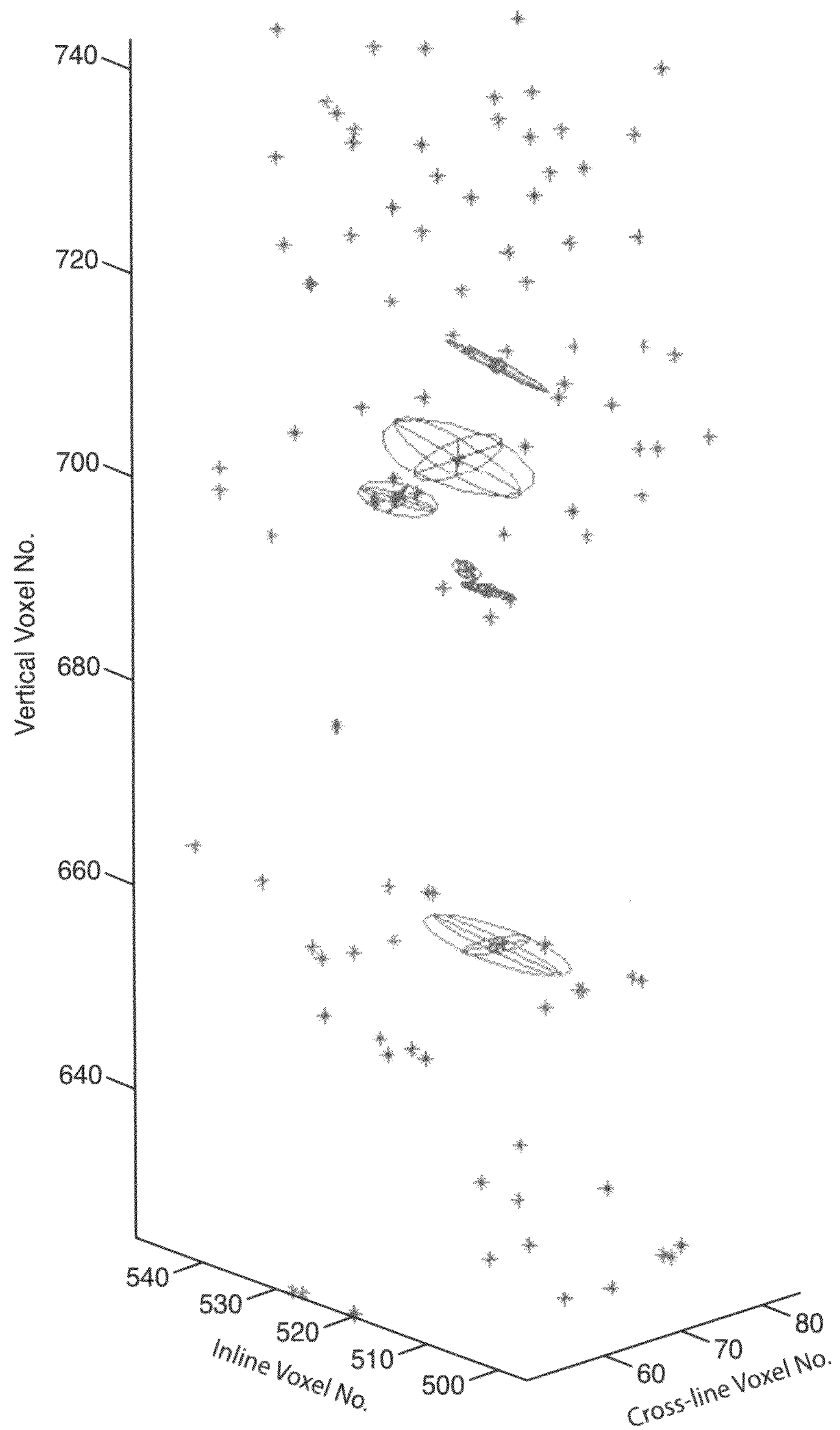
Figure 5:
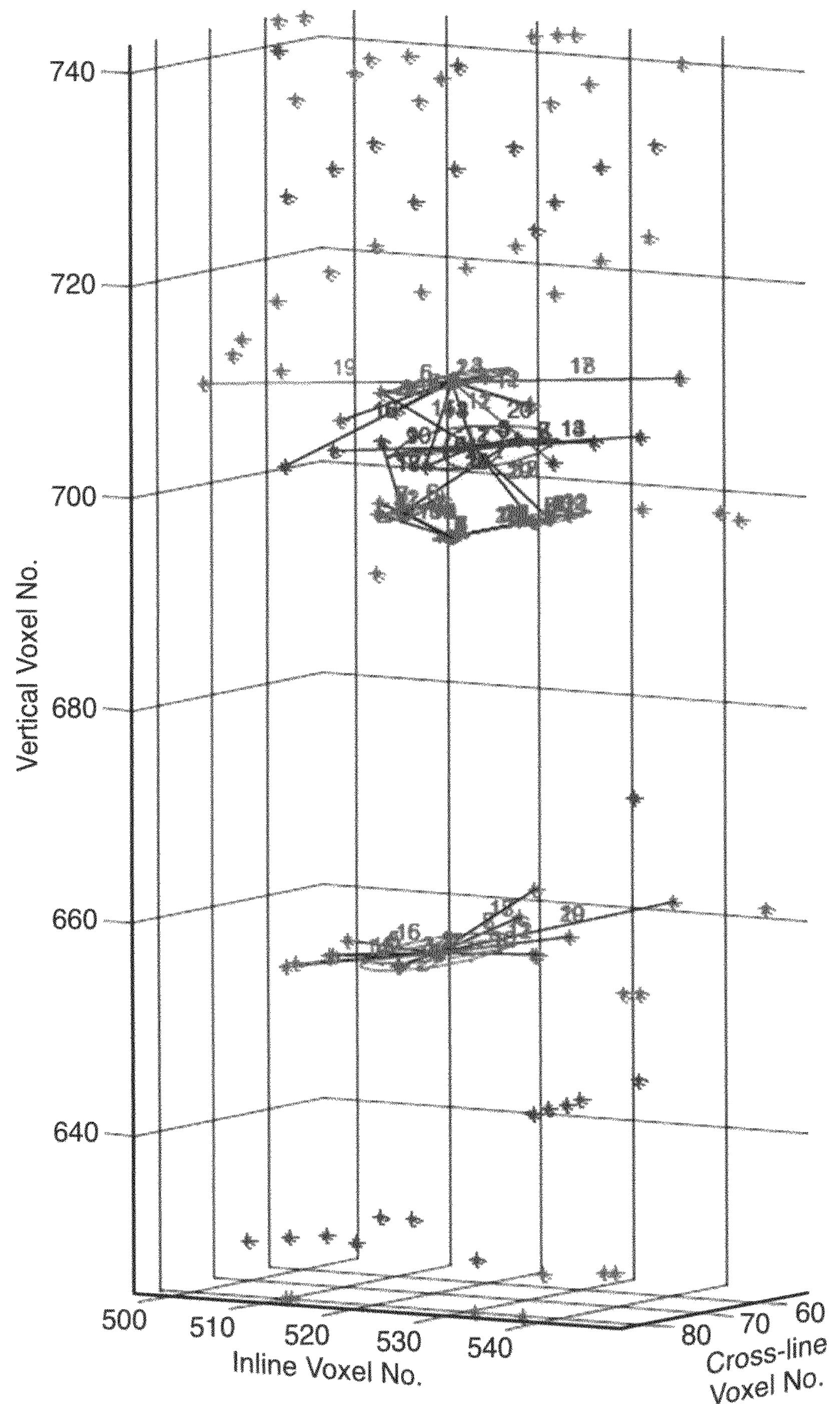
Figure 6:
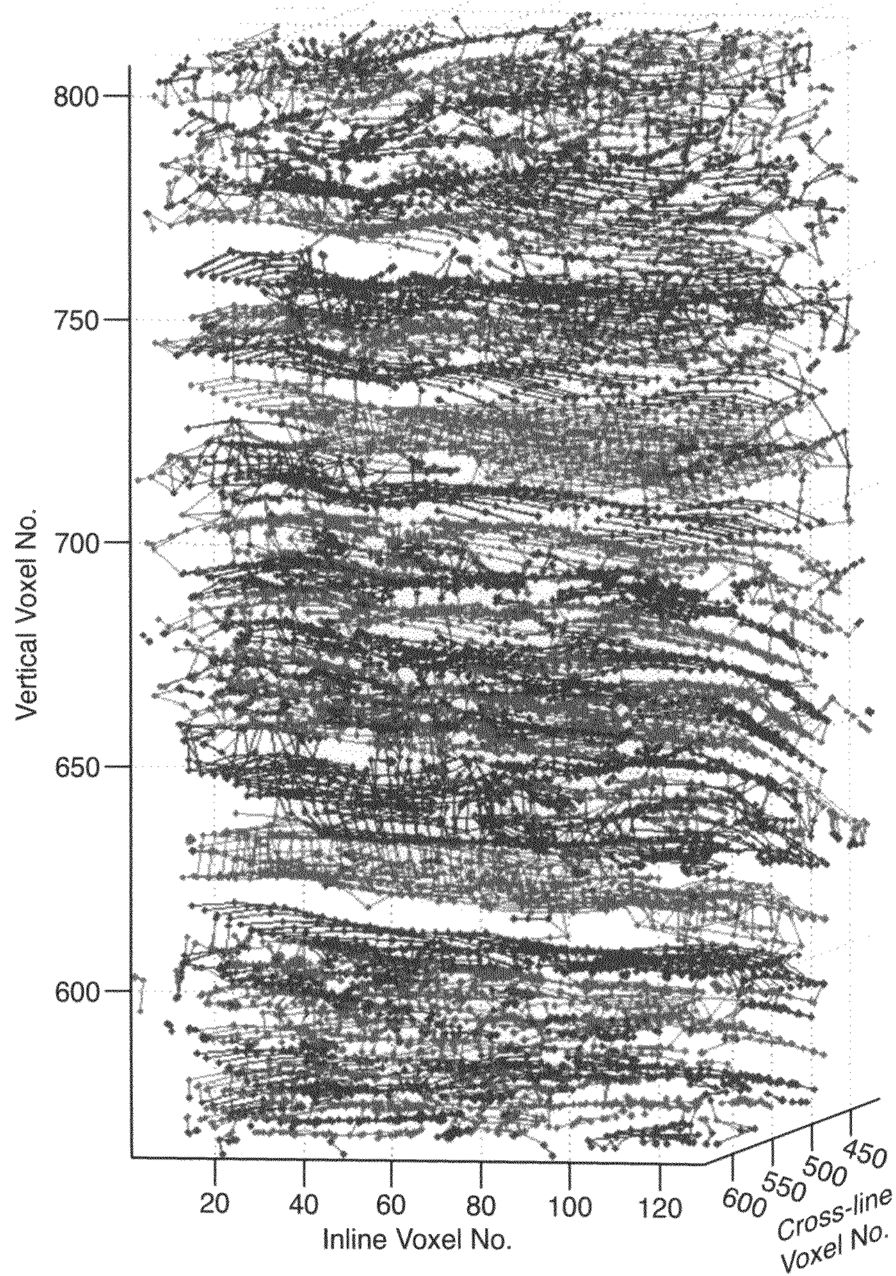
Figure 7:
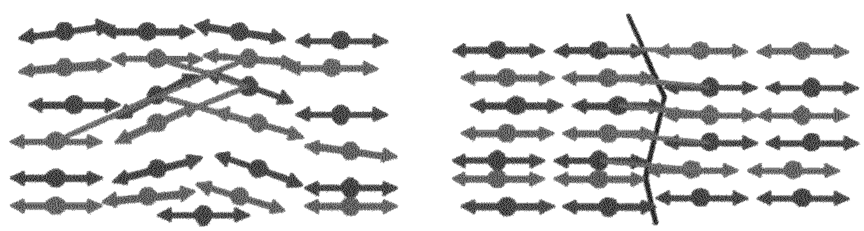

The present invention and its advantages will be better understood by referring to the following detailed description and the attached drawings in which:

FIG. 1 is a schematic diagram illustrating the use of tensor representations to heal the gap between two line segments;

FIG. 2 is a flowchart showing basic steps in one embodiment of the present inventive method;

FIG. 3 shows data displays that illustrate the decomposition of a tensor field formed from a discontinuity data volume into ballness, plateness, and stickness;

FIG. 4 shows six polarized tensor ellipsoids drawn as wireframes surrounded by polarized tokens with suppressed wireframes;

FIG. 5 shows the twenty closest tokens linked to the six tokens singled out in FIG. 4;

FIG. 6 presents an embodiment of the present inventive method where links between tokens are coded using an attribute associated with the tokens;

FIG. 7 illustrates two mechanisms leading to cross-polarity links; and

Figure 8:
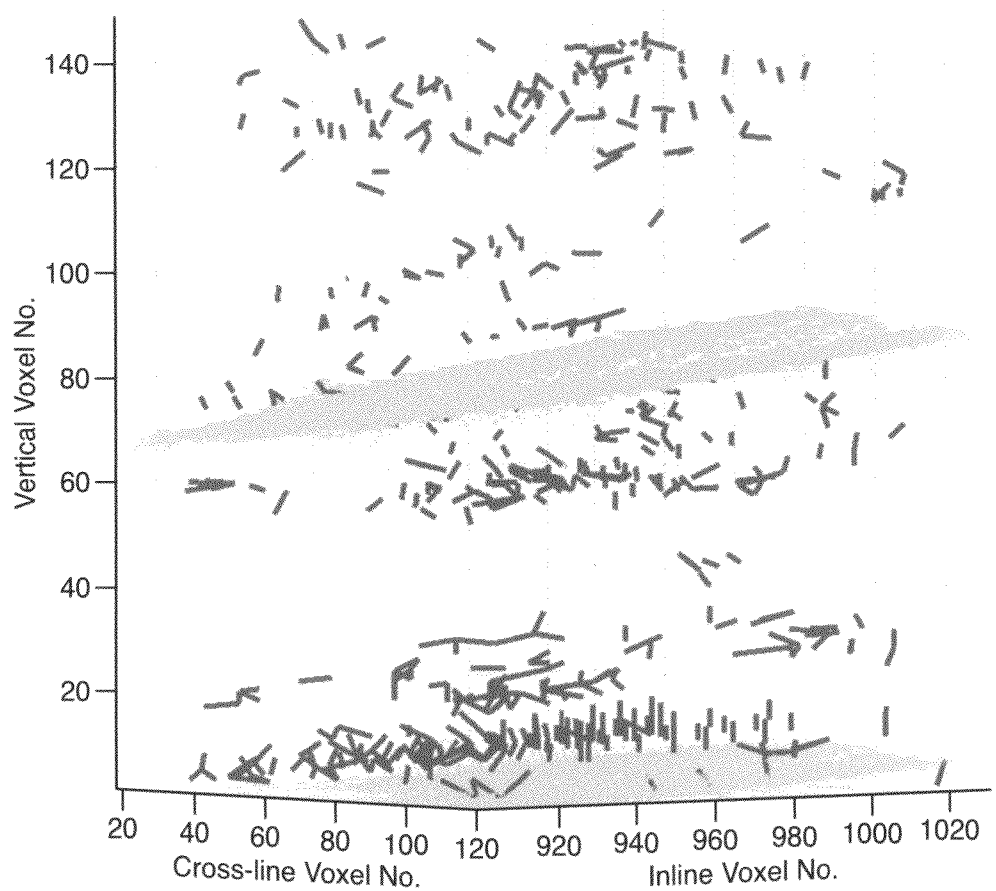

FIG. 8 is a visualization of positive-negative token connections that are concentrated near known unconformities shown in yellow in the original drawing.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

Traditional representation of seismic data is initially based on individual samples and later on digitized objects such as surfaces or bodies. In the inventive method, the fundamental representation of the seismic data is a spatially varying tensor field. The spatial relationships expressed in these tensors can be exploited to link, classify, or separate neighborhoods; or to infer global or relational properties among them. As an example, the tensors may be used for the reconstruction of a feature partially obstructed by noise or for exposure of unusual linkages. In some embodiments of the present inventive method, the tensors will also be decomposed into their fundamentals that may either be used directly as derivative datasets or attributes, or may be used to facilitate linkage, classification, or separation of neighborhoods or analysis of linkage patterns.

FIG. 1 presents an example of how tensor representations can be applied to heal two disconnected line segments that could, for example, represent disconnected segments of a channel axis detected in seismic data. Segment 1, consisting at least of points 2 and 3, is locally represented as tensor field 4. One interpretation of such a tensor field is the magnetic field lines exerted by a ferromagnetic segment, for example. Segment 5 consists of at least points 6 and 7 and is locally represented by tensor field 8. Point 9 is strongly pulled on by both fields and thus is likely to form a bridge between the two segments, effectively reconnecting the segments by healing the gap. Specifically, one method to solve this gap connection problem is as follows: 1) use the segments 1 and 5 to infer local directionality, 2) infer a vector field primitive describing probabilities of connections given the directionality (shown as black arrows), 3) derive tensor fields 4 and 8 from the vector fields, 4) compute evidence of a connection via tensor arithmetic in the overlap of the fields, and 5) based on evidence infer if and where to place and connect a new point 9.

An extension of this interpretation of the tensor field is by analogy to electrostatic forces and force lines. In the electrostatic case, the points and segments exhibit an additional property, namely polarity. Segments and points of opposite polarity attract and thus are likely to be connected. Segments or points of equal polarity repulse, and thus are likely to be disconnected from each other.

The schematic of FIG. 1 is easily modified for polarized cases.

This type of application to curvilinear channel axes can be extended to multiple dimensions, for example, two-dimensional surfaces may be similarly stitched together from partially observed ones. Multidimensional examples include the formation of larger horizons or surfaces from smaller ones or the construction of one large-scale fault from disconnected fault segments. These examples are just a few applications of the present inventive method for applying tensor-representation methods to seismic data.

Though tensors can be used for many purposes including vector field transformations, differential geometry, and the formation of constitutive laws of fundamental physical processes, for the purpose of this inventive method, tensors are considered geometric quantities describing a shape at a given location. In the following description, it will be sufficient to consider tensors to be elliptical representations for small blocks of data, i.e., ellipses in 2D and ellipsoids in 3D. There are many ways to derive tensor representations from data. Gradient maxima, oriented Gabor filters, image segmentation and landmark detection have all been used to derive tensor representations of 2D and 3D data.

Preferred tensors for a given location include the structure tensor or the moment tensor. The structure tensor is computed from vectors given within a neighborhood around said location. For example, an approximate gradient computed from the data can serve as the given vectors. A tensor is formed for each vector by computing the outer product $vv^T$ with itself. The outer-product tensors within said neighborhood are accumulated into the structure tensor for said neighborhood.

Another preferred tensor is the moment tensor formed from the data contained within a neighborhood for the given point. The necessary second moments can be computed with respect to the given point in which case the resulting tensor is known as the raw moment tensor.

$$T=\int d(r)(\|r\|^2 I-rr^T)dV$$

The moments can also be computed with respect the centroid or center of the data within the neighborhood in which case the resulting tensor is called the central moment tensor or also the covariance tensor.

$$T=\int d(r)(\|r-r_0\|^2 I-(r-r_0)(r-r_0)^T)dV$$

One property of a tensor representation is the decomposition of the local tensor into basic components consisting, for example, of a component with no preference of orientation, a component with one preferred spatial orientation, and a component with two preferred spatial orientations. (See, for example, U.S. Patent Application Publication No. 2010/0250475) One such decomposition of a tensor T is:

$$\begin{aligned} T &= \lambda_1\hat{e}_1\hat{e}_1^T+\lambda_2\hat{e}_2\hat{e}_2^T+\lambda_3\hat{e}_3\hat{e}_3^T \\ &= \underbrace{(\lambda_1-\lambda_2)\hat{e}_1\hat{e}_1^T}_{\text{Stick Tensor}}+\underbrace{(\lambda_2-\lambda_3)(\hat{e}_1\hat{e}_1^T+\hat{e}_2\hat{e}_2^T)}_{\text{Plate Tensor}}+ \\ &\quad \underbrace{\lambda_3(\hat{e}_1\hat{e}_1^T+\hat{e}_2\hat{e}_2^T+\hat{e}_3\hat{e}_3^T)}_{\text{Ball Tensor}} \end{aligned}$$

where $\lambda_i$ are the eigenvalues of T and $\hat{e}_i$ are the corresponding eigenvectors. The first term is called the stick tensor, the second term is the plate tensor, and the third term is the ball tensor. Interpretation of the components is dependent on the actual definition of the tensor. In some cases, the stick tensor component may correspond to a piece of surface with normal $\hat{e}_1$, the plate tensor may correspond to a curve segment tangential to $\hat{e}_3$ or equivalently the intersection of two surface pieces with normals $\hat{e}_1$ and $\hat{e}_2$, and the ball tensor may correspond to an idealized point or intersection of three surface pieces with normals $\hat{e}_1$, $\hat{e}_2$, and $\hat{e}_3$. For other tensors, the stick tensor may be interpreted as a curvilinear, one-dimensional component, the plate component may represent surface, while the ball component may be interpreted as an omnidirectional isotropic contribution. Other decompositions may expand a tensor into monopole, dipole, and quadrupole components; or into point source, vector dipole, and double couple.

For the purpose of the present inventive method, tensors capture and encode some local representation of data. If tensors are constructed densely enough within a dataset, then overlap and alignment between tensors will allow communication between tensors. Examination of this communication allows inference of local structures contained in the data. FIG. 2 presents a flowchart of the method that consists of step 21, selection of points or tokens at which tensors are formed; step 22, selection of neighborhoods anchored at these points; step 23, formation of tensors from the data associated with said neighborhoods; and step 24, analysis of the tensors for the formation of an earth model (i.e. a tokenized representation of the seismic data) with the objective of locating and producing hydrocarbons. A token is defined as a point in the data at which a tensor has been computed that describes the data around the point. Since second-order tensors (i.e. tensors whose components form a 2-D array of numbers) are commonly visualized with ellipses or ellipsoids, a tensor at given location is also called an elliplet.

Points or token locations may be selected at random, on a regular grid, or on features of interest such as landmarks or within geologically or geophysically meaningful shapes and segments, for example obtained by thresholding or otherwise segmenting of data.

A first embodiment of the basic method, one that does not use tensor voting nor any other comparison between neighboring tensors, is the usage of tensor decompositions as seismic attributes. Preferably, every point of the seismic dataset is used to anchor a small neighborhood, for example a centered cube of size 11 in every dimension. A tensor is formed at every point from the data contained in its neighborhood, and the tensors are decomposed into their basic components such as balls, plates, sticks. Eigenvalue decomposition of the tensors allows computation of eigenvalues and eigenvectors, and thus computation of coefficients for ballness ($\lambda_3$), plateness ($\lambda_2$-$\lambda_3$) and stickness ($\lambda_1$-$\lambda_2$) as well as their orientations. These coefficients and orientations may be used as seismic attributes during manual or automatic seismic interpretation.

An example of this first embodiment is presented in FIG. 3, where a discontinuity cube (not shown) is decomposed into a ballness cube, a plateness cube, and a stickness cube according to the contribution of ballness, plateness, and stickness to the local tensor formed from discontinuity values. The discontinuity values were computed from a seismic data volume using the method disclosed by Yao et al. in U.S. Pat. No. 6,516,274 entitled "Method for imaging discontinuities in seismic data using dip-steering". The local tensor at a given location is formed by using a neighborhood of 11×11×11 voxels centered at said sample for the computation of a second-order centered moment tensor. It is well known that second-order statistics are sensitive to outliers, and noisy discontinuity data will produce many outliers per blocky neighborhood, so it is expected that the ball saliency will dominate, "inflating" tensors to account for the relatively large "ball" component, and this is confirmed in the present example by the high data magnitudes shown in the ball display in FIG. 3. This sensitivity of second-order moments to outliers (i.e. small disco values at a large distance from the centroid of the neighborhood) reduces the sensitivity to discontinuity structure of the stick and plate saliencies in the tensor representation, and will lead to more isotropic tensor estimates. Alternative methods in robust statistics, such as the Geman-McClure robust estimator function (e.g., Nath and Palaniappan, "Adaptive Robust Structure Tensors for Orientation Estimation and Image Segmentation," in "Advances in Visual Computing," *Lecture Notes in Computer Science*, Volume 3804/2005, pp 445-453 (2005), DOI: 10.1007/1159575554, 2005) or influence function (e.g., Mangin et al, "Distortion correction and robust tensor estimation for MR diffusion imaging," *Medical Image Analysis* 6, 191-198, September 2002), can be used to estimate such tensors and their ballness, plateness, and stickness components.

A second embodiment of the present invention, this embodiment being based on the formalism of tensor voting, combines tensor calculus for representation and non-linear voting for data communication, for example for gap filling or noise removal in seismic data. A novel aspect in the inventive method is the fact that seismic data can be signed or polarized. Seismic amplitudes, for example, can be positive or negative corresponding to a relative pressure increase (decrease) or an upward (downward) displacement of a subsurface particle when a seismic wave passes through. Thus, each tensor may be associated with a sign that is used during the voting process to accept or rebut a hypothesized linkage or to confirm, refute, or suppress an observed linkage. Thus, existing methods of tensor voting can be equipped with tensor signs that can be used in various modes. First, the signs can be used during the voting process to accept linkage between like-signed tensors (i.e., attraction) and deny linkage between unlike ones (i.e., repulsion), although in some applications linkage may be indicated by unlike signs while like signs indicate a break.

Secondly, the signs can be used after traditional, unsigned voting to flag links between tensors with like or unlike signs. For the case of seismic amplitudes, one might expect that most links are between neighborhoods of similar polarity. A link between a positive and a negative neighborhood would be uncharacteristic and could indicate a potential break in the regular pattern of the subsurface layers.

Thirdly, the signs can be used to separate the tensors into two distinct groups and performing the vote within each group separately.

A sign can be viewed as a binary attribute. A further extension of this novel aspect is the use of a non-binary attribute that is used to group the tensors before voting.

A third and preferred embodiment of the inventive method is based on the use of tensor distances to relate individual tokens to larger structures. The tensor representation can be interpreted as a covariance matrix from which distances to the token or tensor location can be measured. Distance can be interpreted as the scaling of the tensor ellipsoid that would make it intersect a given point in space. The effect of such a distance computation is that tokens with aligned tensors are considered to be close, forming for example a sheet or layer.

Distances between tokens may be computed and ranked by inter-token proximity with regard to this distance. For example, a Mahalanobis distance between each pair of tokens based on the tensor representation of the token "of interest" can be computed. The Mahalanobis distance $d(x_2)$ between token "1" at location $x_1$ with tensor $T_1$, and token "2" at $x_2$ is $$d(x_2)=\sqrt{(x_2-x_1)T_1^{-1}(x_2-x_1)}$$

It is to be expected that the closest tokens will be "in the plane" of layer-like structures, and tokens perpendicular to this layer-like structures will be further away and may potentially belong to different planes.

An example is presented in FIG. 4, where red and blue stars represent polarized tokens constructed from seismic data. Although tensors are shown for only six tokens, there is a tensor for each token. For these six particular tokens, Mahalanobis distances to other tokens are computed based in the associated tensors and token pairs are ranked based on said distances. FIG. 5 presents the twenty tokens that are closest to the six given tokens based on the pairwise Mahalanobis distances of the associated tensors. Clearly, the closest tokens are in the plane of layer-like structures. Tokens perpendicular to these layer-like structures have larger distances, are disconnected from the given six tokens, and potentially belong to different planes.

Another embodiment of the present inventive method, which builds upon the third embodiment, combines an attribute such as the binary polarity with nearest neighbors based on the Mahalanobis distances. Every token is linked to a specified number of nearest neighbors based on the Mahalanobis distances. FIG. 6 presents an example where every token is linked with its four nearest neighbors with regard to the Mahalanobis distances. The result is a graph with tokens and links between them where both tokens and links are color coded (where permitted by patent rules) using the polarity attribute. Blue dots indicate positive tokens and red dots indicate negative tokens. Connections between tokens of the same sign are made with the same color line. Links that connect tokens with unlike attributes or polarity are flagged. Connections across tokens of opposite signs are made with magenta lines. Magenta links therefore indicate locations where tokens do not connect within their layer, but instead connect to a nearby layer with opposite sign. These links are unusual and may indicate a location where the regular layering is disrupted. These magenta links could also be caused by abrupt changes in tensor orientations in a layer or region, by non-planar behavior in a tensor, or by tensors fading away.

The nearest-neighbor embodiment combined with the search for polarity mismatched links described above can be used to identify irregular, non-layer behavior in seismic data. Specifically, within layers, nearest neighbor connections are expected to be made between pairs of positive tokens in positive layers or pairs of negative tokens in negative layers. A preponderance of positive-positive connections within a positive layer is expected for locally flat layers and increases confidence that a particular layer is positive, and vice-versa for negative layers. However, positive-negative connections are not expected within a layer, and are likely due to geometrical changes in the layer structure so that the dominant plate tensor directions point out of the plane of the layer, or due to tokens near a layer termination communicating with tokens at another termination of opposite sign, for example across a fault. The two cases are sketched in FIG. 7. The variability of ellipsoid orientations may be called orientation noise and corresponds to the variability of tokens or token neighborhood orientation statistics within a region. Layer sign noise corresponds to the variability of token sign relationships between tokens computed within a region.

FIG. 8 demonstrates that positive-negative connections shown in pink are not occurring at random but are often spatially concentrated. In this example, two known unconformities shown in yellow correspond to regions with large number of positive-negative connections.

In some analyses, tensors may be visualized with color, transparency, wireframes, and/or arrows indicating particular geometries or other characteristics. Such visualizations may be useful to analysts as individual tensors, pairs, large aggregations of tensors, or some representation derived from them. The wireframes of a collection of principal ellipses provides a means to visualize the layer geometry at a coarse (layer trends) and fine scale (individual elliplet orientations and sizes) simultaneously.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims. Persons skilled in the art will readily recognize that in preferred embodiments of the invention, at least some of the steps in the present inventive method are performed on a computer, i.e. the invention is computer implemented. In such cases, the resulting updated physical properties model may either be downloaded or saved to computer storage.

The invention claimed is:

1. A computer-implemented method for analyzing a volume of seismic or seismic attribute data, either being referred to as "the seismic data volume," to discover spatial location and shape of geologic features of a subsurface region, comprising:

making a tensor representation of the seismic data volume, and then grouping the data by a tensor voting method, wherein components of a tensor are computed, using a computer, to represent each of a plurality of selected spatial points, called tokens, in the seismic data volume;

making, with a computer, connections between tokens based on the tensor voting but also on a binary polarity attribute;

generating, with a computer, a visualization of the connections between the tokens in order to discover spatial location and shape of geologic features of the subsurface region; and using the visualization of the connections between the tokens to locate hydrocarbons within the subsurface region.

2. The method of claim 1, wherein the binary polarity attribute is formed by giving each token a + or − sign according to whether it corresponds to a peak or trough of a seismic data trace, and wherein the binary polarity attribute is used during or after the tensor voting process to support or cast doubt upon a proposed linkage between tokens, or before the tensor voting process to group the tensors before voting.

3. The method of claim 2, wherein a linkage between tokens of the same sign resulting from the tensor voting process is interpreted as indicating that their corresponding spatial locations belong to a common subsurface geological layer, and a linkage between tokens of opposite sign from the tensor voting process is interpreted as either signifying termination of a layer or a fault interrupting a layer.

4. The method of claim 1, wherein the tensor for each token is computed from seismic data associated with a selected spatial neighborhood of that token.

* * * * *